US009838254B2

(12) United States Patent
Taniuchi

(10) Patent No.: US 9,838,254 B2
(45) Date of Patent: Dec. 5, 2017

(54) INFORMATION PROCESSING EQUIPMENT, INFORMATION PROCESSING METHOD AND STORAGE MEDIUM

(71) Applicant: NEC Corporation, Tokyo (JP)

(72) Inventor: Noriyuki Taniuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 287 days.

(21) Appl. No.: 14/671,132

(22) Filed: Mar. 27, 2015

(65) Prior Publication Data
US 2015/0280982 A1 Oct. 1, 2015

(30) Foreign Application Priority Data
Mar. 31, 2014 (JP) ................. 2014-071204

(51) Int. Cl.
G06F 15/16 (2006.01)
H04L 12/24 (2006.01)
H04L 29/08 (2006.01)
G06F 3/06 (2006.01)
G06F 9/44 (2006.01)
G06F 9/00 (2006.01)

(52) U.S. Cl.
CPC ............ H04L 41/0806 (2013.01); G06F 3/06 (2013.01); G06F 8/00 (2013.01); G06F 9/00 (2013.01); G06F 9/4416 (2013.01); H04L 67/1097 (2013.01); H04L 67/28 (2013.01)

(58) Field of Classification Search
CPC ..... G06F 3/06; G06F 8/00; G06F 9/00; G06F 9/4416; H04L 41/0806; H04L 67/1097; H04L 67/28
USPC ...... 709/203–230; 711/118–173; 712/28–43; 713/1–100, 300–601
See application file for complete search history.

(56) References Cited

U.S. PATENT DOCUMENTS 6,151,674 A * 11/2000 Takatani ............... G06F 8/61
709/222
7,054,941 B2 * 5/2006 Wang .................. G06F 9/4416
370/231
(Continued)

FOREIGN PATENT DOCUMENTS

JP H01-282660 A 11/1989
JP H09-128164 A 5/1997
(Continued)

Primary Examiner — Ario Etienne
Assistant Examiner — Thorne E Waugh
(74) Attorney, Agent, or Firm — Wilmer Cutler Pickering Hale and Dorr LLP

(57) ABSTRACT

Information processing equipment of the present invention includes a proxy response processing unit which outputs a content of a response stored in association with a command to a storage unit, and a delay processing unit which sends commands to the storage unit in accordance with time stored in a memory unit, receives a response of the storage unit, determines whether or not there is a difference between the response and the stored response of the storage unit and, when there is a difference, updates the stored content of the response, then sets a value indicting an initialized state in a check flag which stores data indicating whether or not the storage unit is initialized, and a control unit which sends a command for the storage unit to the proxy response processing unit and sends a response of the storage unit to the delay processing unit.

6 Claims, 11 Drawing Sheets

(56) References Cited

U.S. PATENT DOCUMENTS

| | | | |
|---|---|---|---|
| 7,181,523 B2* | 2/2007 | Sim | G06F 17/30194 |
| | | | 707/E17.01 |
| 7,389,440 B2* | 6/2008 | Bailey | G06F 1/3228 |
| | | | 713/300 |
| 8,452,846 B2* | 5/2013 | Fredette | G06F 15/167 |
| | | | 709/214 |
| 8,671,293 B2* | 3/2014 | Qi | G06F 1/26 |
| | | | 307/152 |
| 8,988,223 B2* | 3/2015 | Puleston | H04L 67/04 |
| | | | 340/10.1 |
| 2015/0172128 A1* | 6/2015 | Nittur | G06F 9/441 |
| | | | 709/223 |
| 2015/0304233 A1* | 10/2015 | Krishnamurthy | H04L 47/762 |
| | | | 709/226 |

FOREIGN PATENT DOCUMENTS

| | | |
|---|---|---|
| JP | H11-24936 A | 1/1999 |
| JP | H03-005808 A | 11/1999 |
| JP | 2001-014147 A | 1/2001 |
| JP | 2001-147888 A | 5/2001 |
| JP | 2003-532193 A | 10/2003 |
| JP | 2005-284491 A | 10/2005 |
| JP | 2006-155391 A | 6/2006 |
| JP | 2006-276975 A | 10/2006 |
| JP | 2009-193301 A | 8/2009 |

* cited by examiner

Fig. 3

DATA IN FIRST MEMORY UNIT 8 (BEFORE INITIALIZATION)

| LOGICAL DISK UNIT NUMBER | ATTRIBUTE 1 DEVICE RESPONSE PRESENT /ABSENT | ATTRIBUTE 2 HDD VENDOR | ATTRIBUTE 3 HDD MODEL | ATTRIBUTE 4 HDD REVISION | ATTRIBUTE 5 DEVICE STATE | ATTRIBUTE 6 CAPACITY | ATTRIBUTE 7 WRITE ATTRIBUTE | EXECUTION STATUS | CHECK FLAG |
|---|---|---|---|---|---|---|---|---|---|
| (#0) | PRESENT | A | ABC | 1 | AVAILABLE | 100 Gbyte | WRITE ENABLED | NORMAL NORMALITY | 0 |
| (#1) | PRESENT | A | ABC | 1 | AVAILABLE | 100 Gbyte | WRITE ENABLED | NORMAL NORMALITY | 0 |
| (#2) | PRESENT | A | ABC | 1 | AVAILABLE | 100 Gbyte | WRITE ENABLED | NORMAL NORMALITY | 0 |
| (#3) | ABSENT | A | ABC | 1 | UNAVAILABLE | ZERO | WRITE DISABLED | TIME OUT | 0 |
| (#4) | PRESENT | A | ABC | 1 | UNAVAILABLE | 100 Gbyte | WRITE DISABLED | NORMAL NORMALITY | 0 |
| (#5) | PRESENT | B | WBC | 4 | AVAILABLE | 150 Gbyte | WRITE ENABLED | NORMAL NORMALITY | 0 |
| (#6) | PRESENT | B | WBC | 4 | AVAILABLE | 150 Gbyte | WRITE ENABLED | NORMAL NORMALITY | 0 |
| (#7) | PRESENT | B | WBC | 4 | AVAILABLE | 150 Gbyte | WRITE ENABLED | NORMAL NORMALITY | 0 |

Fig. 4

DATA IN FIRST MEMORY UNIT 8 (AFTER INITIALIZATION)

| LOGICAL DISK UNIT NUMBER | ATTRIBUTE 1 DEVICE RESPONSE PRESENT /ABSENT | ATTRIBUTE 2 HDD VENDOR | ATTRIBUTE 3 HDD MODEL | ATTRIBUTE 4 HDD REVISION | ATTRIBUTE 5 DEVICE STATE | ATTRIBUTE 6 CAPACITY | ATTRIBUTE 7 WRITE ATTRIBUTE | EXECUTION STATUS | CHECK FLAG |
|---|---|---|---|---|---|---|---|---|---|
| (#0) | PRESENT | A | ABC | 1 | AVAILABLE | 100 Gbyte | WRITE ENABLED | NORMAL NORMALITY | 1 |
| (#1) | PRESENT | A | ABC | 1 | AVAILABLE | 100 Gbyte | WRITE ENABLED | NORMAL NORMALITY | 1 |
| (#2) | PRESENT | A | ABC | 1 | AVAILABLE | 100 Gbyte | WRITE ENABLED | NORMAL NORMALITY | 1 |
| (#3) | ABSENT | A | ABC | 1 | UNAVAILABLE | ZERO | WRITE DISABLED | TIME OUT | 1 |
| (#4) | PRESENT | A | ABC | 1 | UNAVAILABLE | 100 Gbyte | WRITE DISABLED | LOGICAL UNIT NOT ACCESSIBLE, OFFLINE (asc/ascq=0x04/0x12) | 1 |
| (#5) | PRESENT | B | WBC | 4 | AVAILABLE | 150 Gbyte | WRITE ENABLED | NORMAL NORMALITY | 1 |
| (#6) | PRESENT | B | WBC | 4 | AVAILABLE | 150 Gbyte | WRITE ENABLED | NORMAL NORMALITY | 1 |
| (#7) | PRESENT | B | WBC | 4 | AVAILABLE | 150 Gbyte | WRITE ENABLED | NORMAL NORMALITY | 1 |

Fig. 5

DATA IN SECOND MEMORY UNIT 9

| LOGICAL DISK UNIT NUMBER | TIME INFORMATION |
|---|---|
| (#0) | 2014/2/25 00:00:00. |
| (#1) | 2014/2/25 00:05:00. |
| (#2) | 2014/2/25 00:03:00. |
| (#3) | − |
| (#4) | − |
| (#5) | − |
| (#6) | − |
| (#7) | − |

Fig. 6

DATA IN THIRD MEMORY UNIT 15

| LOGICAL DISK UNIT NUMBER | TIME INFORMATION |
|---|---|
| (#0) | 2014/2/18 00:05:00. |
| (#1) | 2014/2/18 00:10:00. |
| (#2) | 2014/2/18 00:20:00. |
| (#3) | − |
| (#4) | − |
| (#5) | − |
| (#6) | − |
| (#7) | − |

Fig. 7

DATA IN FOURTH MEMORY UNIT 10

| EXECUTION ORDER | COMMAND DESCRIPTION |
|---|---|
| 1 | INQUIRY  LUN#0 |
| 2 | INQUIRY  LUN#1 |
| 3 | INQUIRY  LUN#2 |
| 4 | INQUIRY  LUN#3 |
| 5 | INQUIRY  LUN#4 |
| 6 | INQUIRY  LUN#5 |
| 7 | INQUIRY  LUN#6 |
| 8 | INQUIRY  LUN#7 |
| 9 | TEST  UNIT  READY #0 |
| 10 | READ  CAPACITY LUN#0 |
| 11 | MODE  SENSE LUN#0 |
| .... | ...... |
| 30 | TEST  UNIT  READY #1 |
| 31 | READ  CAPACITY LUN#1 |
| 32 | MODE  SENSE LUN#1 |
|  | ...... |
| .... | ...... |
| .... | ...... |
| 60 | TEST  UNIT  READY #7 |
| 61 | READ  CAPACITY LUN#7 |
| 62 | MODE  SENSE LUN#7 |
| .... | ...... |
| .... | ...... |
| nn | ...... |

Fig. 8

COMMAND LIST 11

| COMMAND |
|---|
| INQUIRY |
| TEST  UNIT  READY |
| READ  CAPACITY |
| MODE  SENSE |

INFORMATION PROCESSING EQUIPMENT, INFORMATION PROCESSING METHOD AND STORAGE MEDIUM

INCORPORATION BY REFERENCE

This application is based upon and claims the benefit of priority from Japanese Patent Application No. 2014-071204, filed on Mar. 31, 2014, the disclosure of which is incorporated herein in its entirety by reference.

TECHNICAL FIELD

The present invention relates to initialization processing for information processing equipment such as server equipment and, in particular, to information processing equipment, an information processing method and a storage medium for initializing large-scale storage equipment.

BACKGROUND ART

In recent years, the capacities of storage equipment designed to be connected to information processing equipment such as server equipment are becoming increasingly larger year after year. The storage capacity of storage equipment is increased, for example, by increasing the number of magnetic disk units included in the storage equipment. The numbers of magnetic disk units in storage equipment may be as many as a thousand to several thousands.

When an OS (Operating System) program on server equipment needs to be restarted for some reason, it takes long time to reboot the server equipment that has a huge number of magnetic disk units. The reason is that the OS program on the server equipment needs to perform processing for making all of the magnetic disk units connected to the server equipment available during the rebooting and the time required for the processing is proportional to the number of the magnetic disk units. This prolongs non-operation time of the server equipment. There has been a growing demand for minimizing such non-operation time of the server equipment.

For example, a technique described in Japanese Laid-open Patent Publication No. 2001-147888 registers beforehand the logical unit numbers of magnetic disk units that are needed for the OS program to boot in boot information. The technique allows the system to identify the magnetic disk units registered in the boot information to avoid trying to access magnetic disk units that do not exists or respond. Note that the logical unit numbers are identification numbers assigned to virtual disk units into which the magnetic disk units of storage equipment are divided or combined.

A technique described in Japanese Translation of PCT International Application Publication No. 2003-532193 provides a list that stores information indicating whether or not server equipment is to be connected with magnetic disk units attached to the server equipment during start-up of an OS program on the server equipment. The technique dynamically modifies descriptions on the list to mask access to magnetic disk units when connecting the server equipment to magnetic disk units attached to the server equipment.

A technique described in Japanese Laid-open Patent Publication No. 2009-193301 saves information stored in a main memory at the completion of initialization of an OS program on server equipment. The technique loads the saved main memory information into the main memory again during rebooting of the server equipment. On the basis of the operation, the technique omits initialization processing on magnetic disk units that would be performed by the OS program on the server equipment.

A technique described in Japanese Laid-open Patent Publication No. 2005-284491 stores information about devices including magnetic disk units that is obtained during first initialization performed by a BIOS (Basic Input Output System) prior to OS program initialization. The technique uses the information about the devices stored during the first initialization for second initialization for start-up of the OS program. On the basis of the operation, the technique omits a process for setting device control information during the second initialization for start-up of the OS program.

SUMMARY

The techniques described in Japanese Laid-open Patent Publication No. 2001-147888 and Japanese Translation of PCT International Application Publication No. 2003-532193 described in the background art have a problem that when there is not a magnetic disk unit accessed by the server equipment or when there is a magnetic disk unit that does not respond, the time required for restarting the OS program is not be reduced.

In the technique described in Japanese Laid-open Patent Publication No. 2009-193301, the OS program and firmware such as BIOS perform cooperation such as exchanging device information through a memory. Accordingly, the technique described in Japanese Laid-open Patent Publication No. 2009-193301 needs alterations to the OS program and the firmware in order to allow the cooperation. Different alterations need to be made to different types of OS programs and firmware or different versions of an OS program and firmware in this case. Therefore the technique described in Japanese Laid-open Patent Publication No. 2009-193301 has a problem that the general versatility of the OS program and firmware is not be ensured.

Note that Japanese Laid-open Patent Publication No. 2005-284491 as well as Japanese Laid-open Patent Publication No. H01 (1989)-282660, Japanese Laid-open Patent Publication No. H03 (1991)-005808, Japanese Laid-open Patent Publication No. H09 (1997)-128164, Japanese Laid-open Patent Publication No. H11 (1999)-024936, Japanese Laid-open Patent Publication No. 2001-014147, Japanese Laid-open Patent Publication No. 2006-155391 and Japanese Laid-open Patent Publication No. 2006-276975, which are related to the present invention, do not describe a technique that improves responses from magnetic disk units.

An object of the present invention is to provide information processing equipment, an information processing method and a storage medium that solve the problems described above and reduce the time required for initialization of the information processing equipment.

Information processing equipment according to an exemplary aspect of the invention includes: a CPU; and a memory device which is connected to the CPU. The memory device includes: a first memory unit which stores information identifying a plurality of storage units included in storage equipment, attributes characterizing the storage units, contents of responses of the storage units to commands required for initialization processing for initializing the storage units, and information concerning initialization; a second memory unit which stores time when each of commands that are not needed for initialization processing is issued to the storage units for the first time among commands to the storage units; a third memory unit which stores a copy of information stored in the second memory unit at the end of initialization processing; and a fourth memory unit which stores commands to be issued to the storage units in initialization processing, the commands being sorted in accordance with the time stored in the third memory unit. The CPU executes operations as a proxy response processing unit, a delay processing unit and a control unit. The proxy response processing unit outputs a content of a response corresponding to each of commands to the storage units, the content of the response being stored in the first memory unit. The delay processing unit outputs a command stored in the fourth memory unit to the storage units, receives a content of a response from each of the storage units, determines whether or not there is a difference between the received content of the response and the content of the response of the storage unit stored in the first memory unit. When there is a difference, the delay processing unit updates the content of the response stored in the first memory unit, and when there is not a difference, does not update the content of the response stored in the first memory unit, and sets a value indicating an initialized state in a check flag column which stores data indicating a state of initialization of each of the storage units. The control unit connects to a server unit including an OS program which sends commands directed to the storage units and receives contents of responses from the storage units, and starts initialization processing in response to start of initialization processing by the OS program. As the initialization processing, the control unit sets a value indicating an uninitialized state in the check flag column; when receiving a command directed to the storage unit from the OS program, stores the command in the fourth memory unit in an order stored in the third memory unit; determines whether or not the command is an initialization command; when the command is an initialization command, sends the command to the proxy response processing unit, receives a content of a response from the proxy response processing unit, and sends the content of the response back to the OS program; when the command is not an initialization command, sends the command to one of the storage units and stores time when the command is received in the second memory unit; when the control unit receives a content of a response to the OS program from the storage unit, sends the content of the response to the delay processing unit. After the end of the initialization processing, the control unit copies the content stored in the second memory unit to the third memory unit, and after copying the content, switches the operation as the control unit to an operation for directly mediating the commands from the server equipment to the storage units and the contents of responses from the storage units to the server equipment.

An information processing method for information processing equipment according to an exemplary aspect of the invention. The information processing equipment includes: a CPU; and a memory device which is connected to the CPU. The information processing method using the memory device as: a first memory unit which stores information identifying a plurality of storage units included in storage equipment, attributes characterizing the storage units, contents of responses of the storage units to commands required for initialization processing for initializing the storage units, and information concerning initialization; a second memory unit which stores time when each of commands that are not needed for initialization processing is issued to the storage units for the first time among commands to the storage units; a third memory unit which stores a copy of information stored in the second memory unit at the end of initialization processing; and a fourth memory unit which stores commands to be issued to the storage units in initialization processing, the commands being sorted in accordance with the time stored in the third memory unit. The information processing method causes the CPU to execute the operations of: (a) outputting a content of a response corresponding to each of commands to the storage units, the content of the response being stored in the first memory unit; (b) outputting a command stored in the fourth memory unit to the storage units; (c) receiving a content of a response from each of the storage units, and determining whether or not there is a difference between the received content of the response and the content of the response of the storage unit stored in the first memory unit; (d) when there is a difference, updating the content of the response stored in the first memory unit; when there is not a difference, not updating the content of the response stored in the first memory unit; and (e) setting a value indicating an initialized state in a check flag column which stores data indicating a state of initialization of each of the storage units; and (f) connecting to a server unit including an OS program which sends commands directed to the storage units and receives contents of responses from the storage units; (g) starting initialization processing in response to start of initialization processing by the OS program; and as the initialization processing, (g-1) setting a value indicating an uninitialized state in the check flag column; (g-2) when receiving a command directed to the storage unit from the OS program, storing the command in the fourth memory unit in an order stored in the third memory unit; determines whether or not the command is an initialization command; when the command is an initialization command, sending the content of the response stored in the first memory unit back to the OS program; when the command is not an initialization command, sending the command to one of the storage units and storing time when the control unit received the command in the second memory unit; (h) after the end of the initialization processing, copying the content stored in the second memory unit to the third memory unit; and after copying the content, directly mediating commands to the server equipment and the storage units and the content of responses from the storage units to the server equipment.

A non-transitory computer-readable storage medium according to an exemplary aspect of the invention a program. The program causing information processing equipment which includes: a CPU; and a memory device which is connected to the CPU, to perform a method. The method using the memory device as: a first memory unit which stores information identifying a plurality of storage units included in storage equipment, attributes characterizing the storage units, contents of responses of the storage units to commands required for initialization processing for initializing the storage units, and information concerning initialization; a second memory unit which stores time when each of commands that are not needed for initialization processing is issued to the storage units for the first time among commands to the storage units; a third memory unit which stores a copy of information stored in the second memory unit at the end of initialization processing; and a fourth memory unit which stores commands to be issued to the storage units in initialization processing, the commands being sorted in accordance with the time stored in the third memory unit. The method causes the CPU to execute the operations of: (a) outputting a content of a response corresponding to each of commands to the storage units, the content of the response being stored in the first memory unit; (b) outputting a command stored in the fourth memory unit to the storage units; (c) receiving a content of a response from each of the storage units, and determining whether or not there is a difference between the received content of the response and the content of the response of the storage unit stored in the first memory unit; (d) when there is a difference, updating the content of the response stored in the first memory unit; when there is not a difference, not updating the content of the response stored in the first memory unit; and (e) setting a value indicating an initialized state in a check flag column which stores data indicating a state of initialization of each of the storage units; and (f) connecting to a server unit including an OS program which sends commands directed to the storage units and receives contents of responses from the storage units; (g) starting initialization processing in response to start of initialization processing by the OS program; and as the initialization processing, (g-1) setting a value indicating an uninitialized state in the check flag column; (g-2) when receiving a command directed to the storage unit from the OS program, storing the command in the fourth memory unit in an order stored in the third memory unit; determines whether or not the command is an initialization command; when the command is an initialization command, sending the content of the response stored in the first memory unit back to the OS program; when the command is not an initialization command, sending the command to one of the storage units and storing time when the control unit received the command in the second memory unit; (h) after the end of the initialization processing, copying the content stored in the second memory unit to the third memory unit; and after copying the content, directly mediating commands to the server equipment and the storage units and the content of responses from the storage units to the server equipment.

BRIEF DESCRIPTION OF THE DRAWINGS

Exemplary features and advantages of the present invention will become apparent from the following detailed description when taken with the accompanying drawings in which:

FIG. 3 is a diagram illustrating an example of data in a first memory unit before initialization is started;

FIG. 4 is a diagram illustrating an example of data in the first memory unit after initialization;

FIG. 5 is a diagram illustrating an example of data in a second memory unit;

FIG. 6 is a diagram illustrating an example of data in a third memory unit;

FIG. 7 is a diagram illustrating an example of data in a fourth memory unit;

FIG. 8 is a diagram illustrating an example of descriptions of a command on a command list;

EXEMPLARY EMBODIMENT

Exemplary embodiments of the present invention will be described with reference to drawings.

Figure 1:
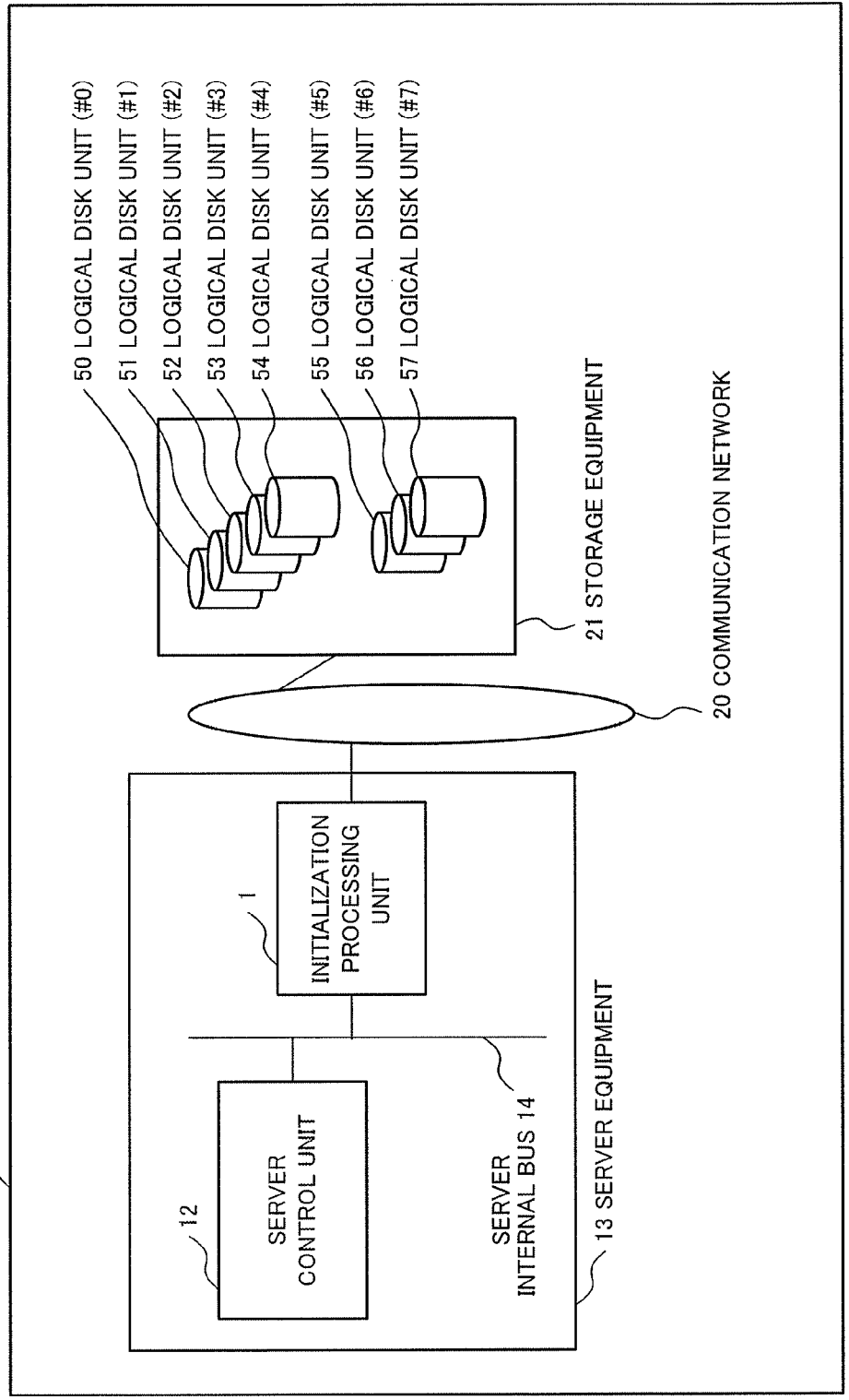
FIG. 1 is a block diagram illustrating an exemplary configuration of an information processing system according to a first exemplary embodiment of the present invention.

FIG. 1 is a block diagram illustrating an exemplary configuration of an information processing system 100 including information processing equipment according to a first exemplary embodiment of the present invention.

The information processing system 100 includes server equipment 13 which is the information processing equipment according to the first exemplary embodiment, a communication network 20, and storage equipment 21.

The server equipment 13 includes a server control unit 12, a server internal bus 14, and an initialization processing unit 1.

The server control unit 12 executes information processing on the server equipment 13. In particular, the server control unit 12 controls an OS program on the server equipment 13. Therefore, commands and instructions from the OS program are commands and instructions from the server control unit 12. Similarly, responses (outputs) to the OS program are responses (outputs) to the server control unit 12.

The server internal bus 14 intermediates information between the server control unit 12 and the initialization processing unit 1.

The initialization processing unit 1 sends a command received from the server control unit 12 (OS program) through the server internal bus 14 to the storage equipment 21 through the communication network 20. Furthermore, the initialization processing unit 1 sends information received from the storage equipment 21 through the communication network 20 (hereinafter referred to as contents of a responses or response data) to the server control unit 12 (OS program) through the server internal bus 14.

The storage equipment 21 includes one or more physical magnetic disk units. Furthermore, the storage equipment 21 includes logical disk units (hereinafter also referred to as "storage devices") into which the magnetic disk units are logically divided or combined. For example, the storage equipment 21 in FIG. 1 includes a logical disk unit (#0) 50, a logical disk unit (#1) 51, a logical disk unit (#2) 52, a logical disk unit (#3) 53, a logical disk unit (#4) 54, a logical disk unit (#5) 55, a logical disk unit (#6) 56, and a logical disk unit (#7) 57, for example. However, the number of the logical disk units included in the storage equipment 21 of this exemplary embodiment does not necessarily need to be limited to eight. The logical disk units given above are referred to as LUs (logical units). A number (unit number) that uniquely identifies each LU is referred to as LUN (logical unit number). In FIG. 1, the LUN of each of the logical disk units is represented by adding "#".

The communication network 20 is a network that interconnects the server equipment 13 and the storage equipment 21.

Figure 2:
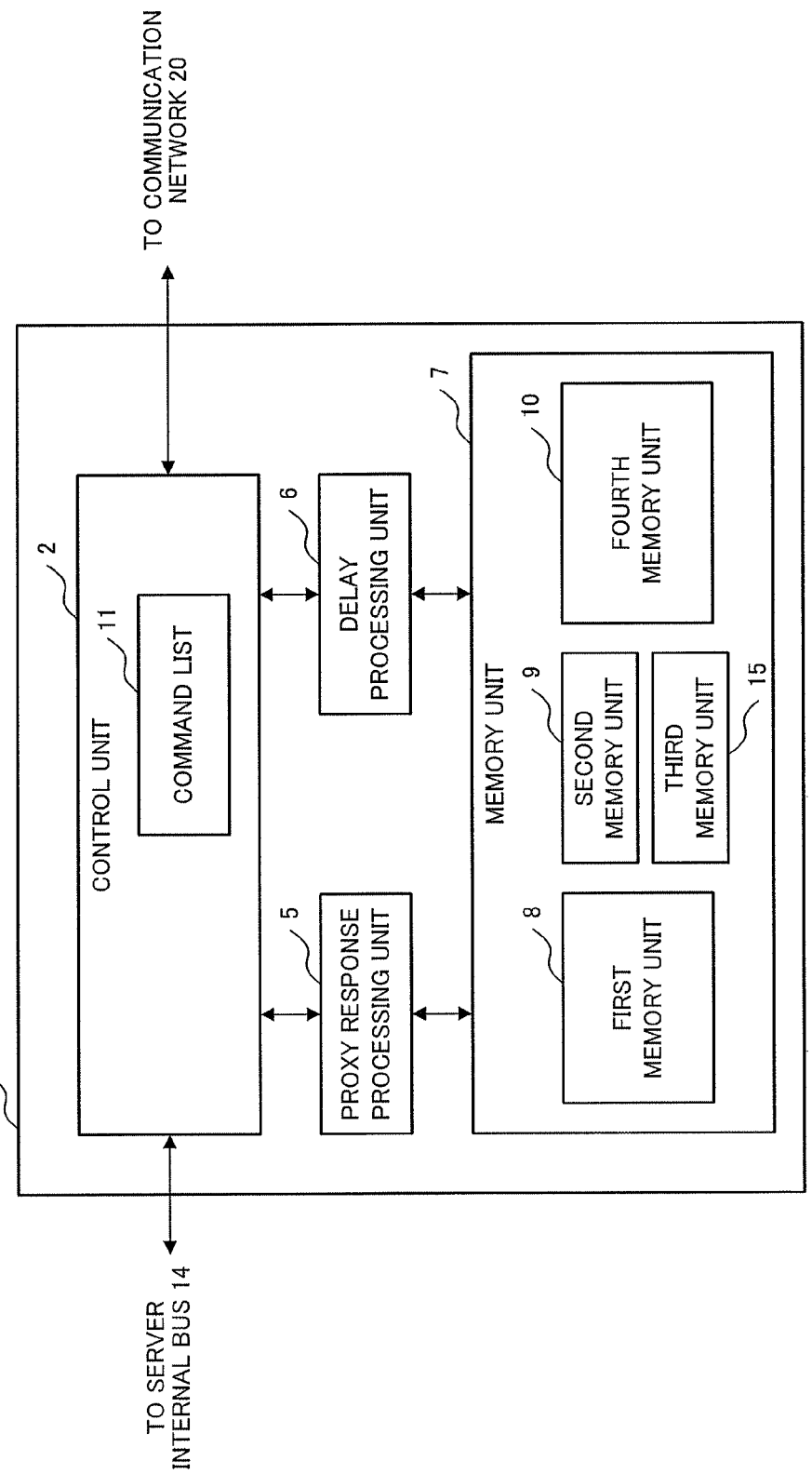
FIG. 2 is a block diagram illustrating an exemplary configuration of an initialization processing unit.

FIG. 2 is a block diagram illustrating an exemplary configuration of the initialization processing unit 1.

The initialization processing unit 1 includes a control unit 2, a proxy response processing unit 5, a delay processing unit 6, and a memory unit 7.

The control unit 2 controls inputs and outputs of information between the initialization processing unit 1 and the server control unit 12 through the server internal bus 14, and controls inputs and outputs of information between the initialization processing unit 1 and the storage equipment 21 through the communication network 20. The control unit 2 makes the proxy response processing unit 5 execute proxy response processing, and makes the delay processing unit 6 execute delay response processing. The control unit 2 writes, updates, or reads information stored in the memory units included in the memory unit 7, which will be described later. The control unit 2 contains a command list 11 storing commands required for initialization processing.

The proxy response processing unit 5 receives from the control unit 2 commands sent from the server control unit 12 (OS program) to the initialization processing unit 1. Then, the proxy response processing unit 5 outputs the contents of responses to be output to the server control unit 12 (OS program) to the control unit 2 as a proxy for the logical disk units included in the storage equipment 21.

The delay processing unit 6 outputs commands stored in the memory unit 7 to the logical disk units as a proxy for the server control unit 12 (OS program). The delay processing unit 6 updates information stored in the memory unit 7 on the basis of the contents of responses from the logical disk units.

The memory unit 7 stores various items of information received from the other units. As illustrated in FIG. 2, the memory unit 7 includes a first memory unit 8, a second memory unit 9, a third memory unit 15, and a fourth memory unit 10.

The first memory unit 8 stores data sets each of which is made up of the unit number of each of the logical disk units included in the storage equipment 21, an attribute that characterizes the logical disk unit, the content of a response to a command required for (relating to) initialization, and a check flag, which will be described later. The first memory unit 8 is implemented by a non-transitory recording medium which does not lose data when power is removed from it. Accordingly, when the server equipment 13 is powered off and then rebooted, the first memory unit 8 holds data stored just before the power-off.

The second memory unit 9 stores the time of first issue of a command that is not stored in the first memory unit 8, that is, a command which does not relate to initialization processing (a command that is not included in the command list 11) to a logical disk unit. The second memory unit 9 does not need to be a non-transitory storage medium.

The third memory unit 15 copies (stores) data stored in the second memory unit 9 at the completion of initialization processing for the server equipment 13. The third memory unit 15 is implemented by a non-transitory storage medium which does not lose data when power is removed from the server equipment 13. Accordingly, when the server equipment 13 is powered off and then rebooted, the third memory unit 15 holds data stored just before the power-off. Furthermore, the time, which is stored in the third memory unit 15 and when commands that do not relate to initialization processing are issued to the logical disk units for the first time, are used for sorting commands relating to the logical disk units that are stored in the fourth memory unit 10, which will be described later.

The fourth memory unit 10 stores commands that are output by the server equipment 13 (OS program) to the logical disk units and sorted according to the time stored in the third memory unit 15. Unlike the first memory unit 8 and the second memory unit 9, the fourth memory unit 10 does not need to include a non-transitory recording medium.

As described previously, the command list 11 included in the control unit 2 contains the types of commands to be stored in the first memory unit 8.

The initialization processing unit 1 may be implemented by dedicated hardware or a general-purpose computer that operates under program control.

Specifically, the initialization processing unit 1 is implemented as follows.

For example, the components of the initialization processing unit 1 may be implemented by hardware circuits.

Alternatively, the components of the initialization processing unit 1 may be implemented by a plurality of devices interconnected through a network or a bus.

The device including the initialization processing unit 1 illustrated in FIG. 2 may be connected to the device including the server control unit 12, for example, through the bus or the network. The device including the initialization processing unit 1 may connect to the storage equipment 21 through the communication network 20. The device including the initialization processing unit 1 may operate in the same way as the initialization processing unit 1 included in the server equipment 13 does, as will be described below.

Note that the device including the initialization processing unit 1 is a minimal configuration in exemplary embodiments of the present invention.

A plurality of components of the initialization processing unit 1 may be implemented by one piece of hardware.

The initialization processing unit 1 may be implemented as a computer device including a CPU (Central Processing Unit), a ROM (Read Only Memory), and a RAM (Random Access Memory). The initialization processing unit 1 may be implemented as a computer device including an input/output circuit (IOC), a host bus adapter (HBA) and a network interface circuit (NIC) in addition to the components given above.

Figure 13:
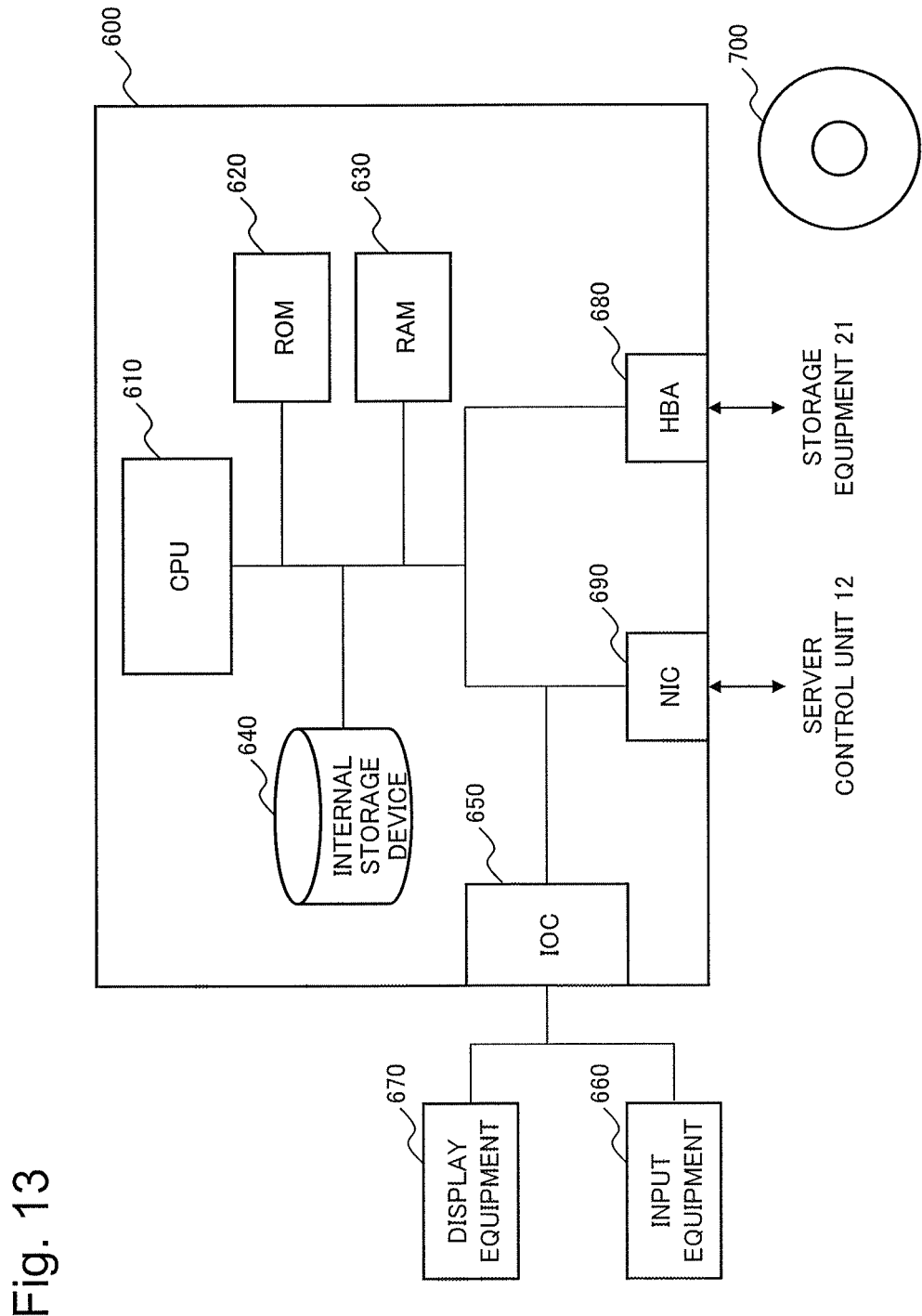
FIG. 13 is a block diagram illustrating an exemplary configuration of information processing equipment according to the first exemplary embodiment.

FIG. 13 is a block diagram illustrating an exemplary configuration of information processing equipment 600 that implements the functionality of the initialization processing unit 1. The information processing equipment 600 may include the functionality of the server control unit 12. In other words, the information processing equipment 600 may act as the server equipment 13.

The information processing equipment 600 includes a CPU 610, a ROM 620, a RAM 630, an internal storage device 640, an IOC 650, an HBA 680 and an NIC 690. The information processing equipment constitutes a computer device.

The CPU 610 reads a program from the ROM 620. Then, the CPU 610 controls the RAM 630, the internal storage device 640, the IOC 650, the HBA 680 and a NIC 690 on the basis of the read program. Therefore, the computer including the CPU 610 controls these configurations and realizes each function as the initialization processing unit 1 illustrated in FIG. 2.

The CPU 610 may use the RAM 630 or the internal storage device 640 as a temporary storage for a program when the CPU 610 implements each function.

Furthermore, the CPU 610 may read a program in a storage medium 700 storing programs in a computer-readable manner by using a storage medium reading device, not depicted. Alternatively, the CPU 610 may receive a program from an external device, not depicted, through the HBA 680 or the NIC 690, may save the program in the RAM 630, and may operate in accordance with the saved program.

The ROM 620 stores a program to be executed by the CPU 610 and fixed data. The ROM 620 may be a P-ROM (Programmable-ROM) or a flash ROM, for example.

The RAM 630 temporarily stores a program to be executed by the CPU 610 and data. The ROM 630 may be a D-RAM (Dynamic-RAM), for example.

The internal storage device 640 stores data and programs that the information processing equipment 600 saves over a long period of time. The internal storage device 640 may act as a temporary storage device for the CPU 610. The internal storage device 640 may be a hard disk device, a magneto-optical disk device, an SSD (Solid State Drive), or a disk array device, for example.

The ROM 620 and the internal storage device 640 are non-transitory storage media. The ROM 620 or the internal storage device 640 functions as the first memory unit 8 and the third memory unit 15.

On the other hand, the RAM 630 is a transitory storage medium. The RAM 630 functions as the second memory unit 9 and the fourth memory unit 10.

The CPU 610 is operable in accordance with a program stored in the ROM 620, the internal storage device 640, or the RAM 630. In other words, the CPU 610 is operable using a non-transitory storage medium or a transitory storage medium.

Note that the ROM 620, the RAM 630 and the internal storage device 640 are storage devices connected to the CPU 610.

The IOC 650 communicates data between the CPU 610 and input equipment 660 and display equipment 670. The IOC 650 may be an IO interface card or a USB (Universal Serial Bus) card, for example.

The input equipment 660 is equipment that receives instructions input by an operator of the information processing equipment 600. The input equipment 660 may be a keyboard, a mouse or a touch panel, for example.

The display equipment 670 is equipment that presents information to the operator of the information processing equipment 600. The display equipment 670 may be a liquid-crystal display, for example.

The HBA 680 mediates data communication with the storage equipment 21 through the communication network 20. The HBA 680 may be a fiber channel card or a LAN (Local Area Network) card, for example.

The NIC 690 mediates data communication with the server control unit 12 through the server internal bus 14. The NIC 690 may be a PCI (Peripheral Component Interconnect) card or PCI express card, for example.

The information processing equipment 600 thus configured is capable of achieving the same advantageous effects as the initialization processing unit 1.

The reason is that the CPU 610 of the information processing equipment 600 is capable of implementing the same functionality as that of the initialization processing unit 1 in accordance with a program.

FIG. 3 is a diagram illustrating an example of data stored in the first memory unit 8 before initialization, i.e. before rebooting. FIG. 4 is a diagram illustrating an example of data stored in the first memory unit 8 after initialization, i.e. after the rebooting.

The data set stored in the first memory unit 8 includes a logical disk unit number column, an attribute 1 column, an attribute 2 column, an attribute 3 column, an attribute 4 column, an attribute 5 column, an attribute 6 column, an attribute 7 column, an execution status column, and a check flag column as columns for storing items of data constituting the set. The logical disk unit number column stores the unit number (LUN) of each of the logical disk units set in the storage equipment 21. The attribute 1 column stores an indication of presence or absence of a response to a query and command from the OS program in each logical disk unit. The attribute 2 column stores an identifier of a vender of the physical magnetic disk unit corresponding to the logical disk unit. The attribute 3 columns stores an identifier of the model of a physical magnetic disk unit to which the logical disk unit is allocated. The attribute 4 column stores a revision of the physical magnetic disk unit to which the logical disk unit is allocated. The attribute 5 column stores a device state indicating whether or not the logical disk unit is available. The attribute 6 column stores the storage capacity of the logical disk unit. The attribute 7 column stores a write attribute indicating whether or not the logical disk unit is write enabled or write disabled. The execution status column stores an execution status, which is a state of execution of a response when an inquiry about the status of the logical disk unit is issued from the OS program to the logical disk unit. In the check flag column, a value (for example "1") indicating an initialized state is set when a proxy command to the logical disk unit is unnecessary, or when processing of a proxy command has been executed, i.e. when initialization is not needed. When rebooting, i.e. initialization is started, the control unit 2 of the initialization processing unit 1 writes a value (for example "0") indicating an uninitialized state in the check flag column for all of the logical disk units. In other words, the check flag column indicates whether initialization processing is completed or is not performed.

FIG. 5 is a diagram illustrating an example of data stored in the second memory unit 9. The second memory unit 9 includes a logical disk unit number column and a time information column. The logical disk unit number column stores the unit number (LUN) of each of the logical disk units set in the storage equipment 21. The time information column stores time when a command, that is not contained in the first memory unit 8 among commands and is output by the OS program in the period from restart of the OS program to initialization processing and activation of an application, is executed for (issued to) the logical disk unit for the first time. In other words, the time information column stores time when a command, that does not relates to initialization processing of the OS program, is executed for (issued to) the logical storage unit for the first time.

FIG. 6 is a diagram illustrating an example of data stored in the third memory unit 15. Because the third memory unit 15 stores data stored in the second memory unit 9 as a copy, the third memory unit 15 stores the same items of the second memory unit 9. Accordingly, the third memory unit 15 includes a logical disk unit number column and a time information column.

FIG. 7 is a diagram illustrating an example of data stored in the fourth memory unit 10. The fourth memory unit 10 includes an execution order column and a command description column. The execution order column stores the order in which commands output from the server equipment 13 (OS program) to the logical disk units are issued. The command description column stores the descriptions of commands issued from the server equipment 13 (OS program) to the logical disk units.

FIG. 8 is a diagram illustrating an example of the command list 11. The command list 11 includes a command column. The command column stores the types of commands to be stored in the first memory unit 8 (commands relating to initialization processing). The types of commands are registered beforehand in the command list 11 in the initialization processing unit 1. For example, a user registers the command list 11 in the initialization processing unit 1. The types of a command stored in the command list 11 as command descriptions can be changed as needed.

An operation of this exemplary embodiment will be described with reference to drawings.

First, it is assumed that the physical magnetic disk unit included in the storage equipment 21 is divided into eight logical disk units (logical disk units (#0) 50 to (#7) 57) when the information processing system 100 is configured. This state is configured on the basis of management functionality of the storage equipment 21.

Figure 9:
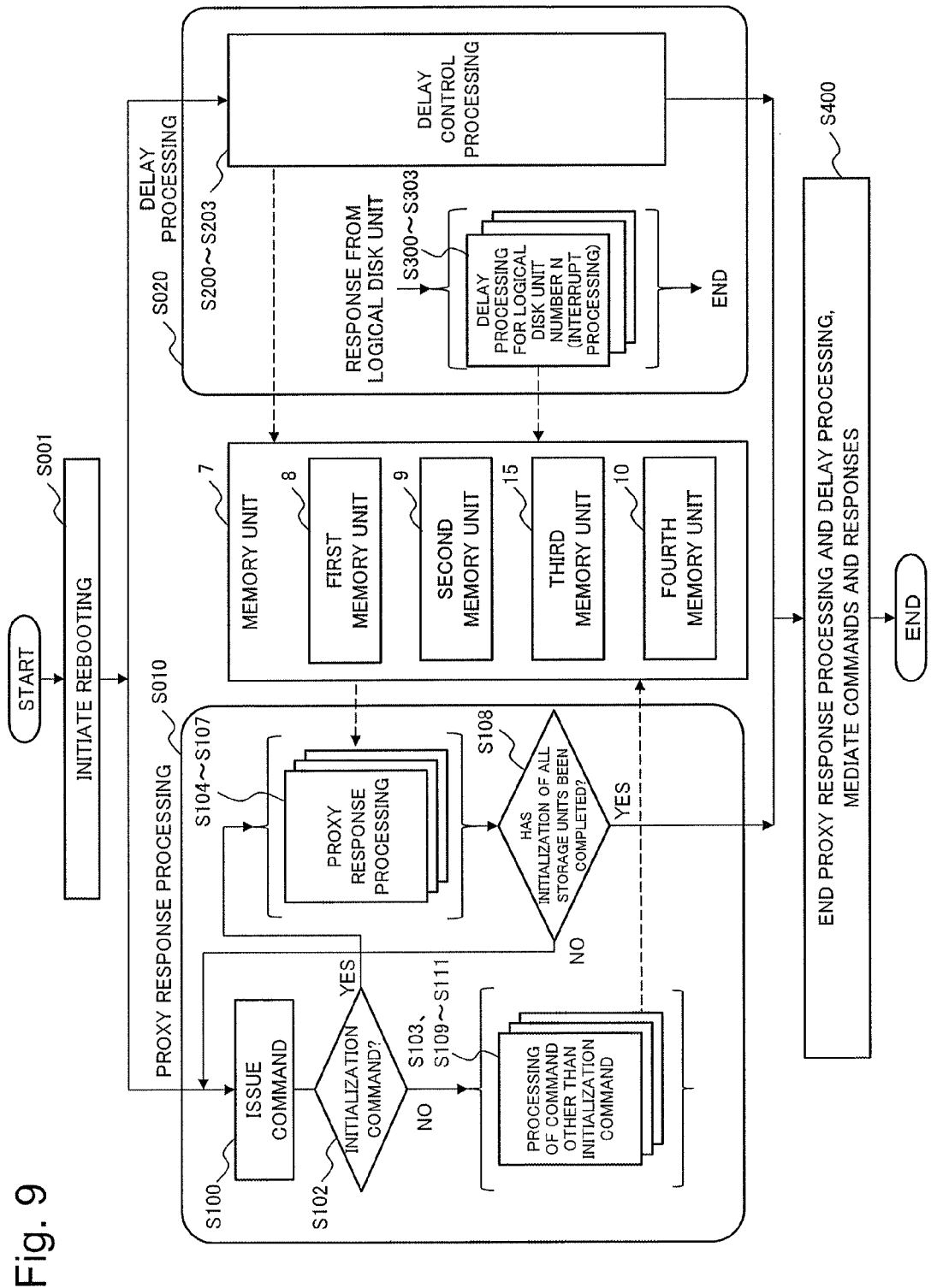
FIG. 9 is a schematic diagram illustrating an example of operation of an initialization processing performed by the initialization processing unit.

Next, a process performed by the initialization processing unit 1 according to this exemplary embodiment will be described with reference to FIG. 9.

First, the initialization processing unit 1 starts initialization processing in rebooting in response to power resupply of the server equipment 13, depression of a reset button, execution of a reset command in a program, or the like (step S001). Then, the initialization processing unit 1 performs proxy response processing in the proxy response processing unit 5 (step S010) and delay response processing in the delay processing unit 6 (step S020).

The proxy response processing (step S010) and the delay response processing (step 020) in the initialization processing unit 1 are asynchronous processing, and are executed in parallel. When the respective processing ends, the process by the initialization processing unit 1 proceeds to the processing at step S400.

The proxy response processing (step S010) includes an issue of a command for initialization from the OS program to logical disk units. The proxy response processing (step S010) further includes proxy response processing in the proxy response processing unit 5 (step S100 to step S111), which will be described later.

The delay response processing (step S020) includes delay processing in the delay processing unit 6 for the content of a response of a logical disk unit, which will be described later. The delay response processing (step S020) further includes processing (step 300 to step 304) for storing the content of a response of a logical disk unit in the first memory unit in processing performed in response to reception of the content of the response of the logical disk, which will be described later.

When the proxy response processing (step S010) and the delay response processing (step S020) end, the process by the initialization processing unit 1 proceeds to step S400. At step S400, the control unit 2 copies the data stored in the second memory unit 9 to the third memory unit 15. Then, the control unit 2 ends the proxy response processing (step S010) and the delay processing (step S020). In other words, the initialization processing unit 1 ends the initialization processing. Then the control unit 2 of the initialization processing unit 1 switches processing of commands from the OS program. Namely, the control unit 2 switches to a mediating operation process for directly communicating commands issued from the OS program and responses from the logical disk units.

Figure 10:
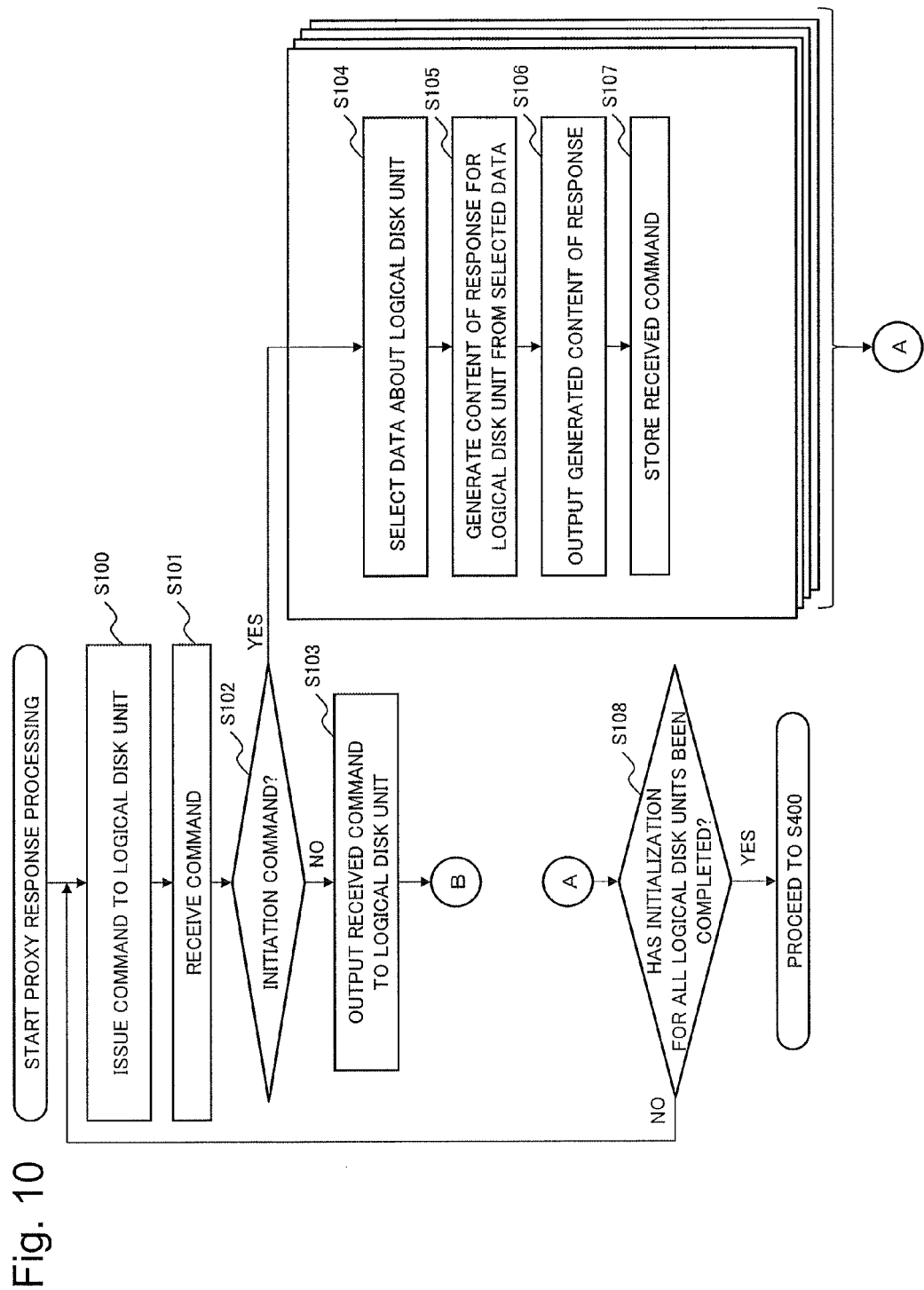
FIG. 10 is a flowchart illustrating an example of operation of proxy response processing performed by the initialization processing unit.
Figure 11:
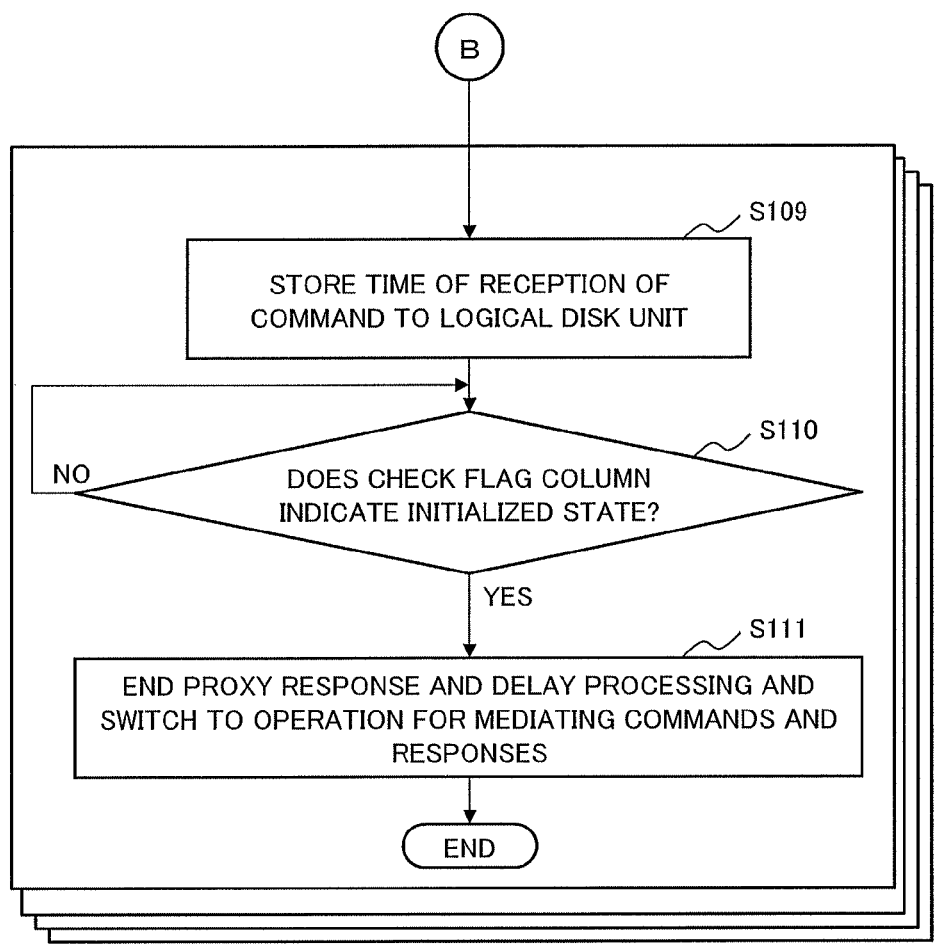
FIG. 11 is a flowchart illustrating an example of operation of processing of a command other than an initialization command performed by the initialization processing unit.

Next, the proxy response processing (step S010) will be described with reference to flows in FIGS. 10 and 11.

First, when the control unit 2 detects execution of rebooting of the server equipment 13, i.e. when the control unit 2 detects start of initialization on the server equipment 13, the control unit 2 starts the initialization processing. When starting the initialization processing, the control unit 2 sets data (hereinafter denoted by "0") indicating an unrecognized state (uninitialized state) in the check flag column (the column indicating completion of initialization) in all rows in the first memory unit 8. The control unit 2 may initialize the check flag column via the proxy response processing unit 5. Note that the control unit 2 does not manipulate the other columns in the first memory unit 8.

The data in FIG. 3 will be described using the first row of the data in the first memory unit 8 in FIG. 3 (the data set with #0 in the logical disk unit number column) as an example. The logical disk unit number column stores the logical unit number (LUN) of the logical disk unit. In the case of the first row, the logical disk unit column stores "#0". In other word, the data set in the first row is data concerning the logical disk unit (#0) 50. The column of presence or absence of a response which is indicated as the attribute 1 column is "present". The "presence" indicates that the logical disk unit (#0) 50 has responded and properly operated during the previous boot-up of the server equipment 13. The HDD vender column which is the attribute 2 column stores a manufacturer of the physical magnetic disk unit corresponding to the logical disk unit. In this case, the HDD vendor column stores "A". In other words, the physical magnetic disk unit corresponding to the logical disk unit (#0) 50 is a product manufactured by Company A. The HDD model column which is the attribute 3 column stores the model name of the physical magnetic disk unit corresponding to the logical disk unit. In this case, the HDD model column stores "ABC". In other words, the model name of the physical magnetic disk unit corresponding to the logical disk unit (#0) 50 is "ABC". The HDD revision column which is the attribute 4 column stores the revision number of the physical magnetic disk unit corresponding to the logical disk unit. In this case, the HDD revision column stores "1". In other words, the revision of the physical magnetic disk unit corresponding to the logical disk unit (#0) 50 is "1". The device state column which is the attribute 5 column stores information about availability of the logical disk unit. In this case, the device state column stores "available". In other words, the logical disk unit (#0) 50 is available. The capacity column which is the attribute 6 column stores the capacity of the logical disk unit. In this case, the capacity column stores "100 GB". In other words, the capacity of the logical disk unit (#0) 50 is 100 GB. The write attribute column which is the attribute 7 column stores a state of write of the logical disk unit. In this case, the write attribute column stores "write enabled". In other words, the logical disk unit (#0) 50 is enable to be written. The execution status column stores the content of a response to an initialization command from the OS program. In this case, the execution status column stores "Normal". In other words, the logical disk unit (#0) 50 has normally responded to the command issued from the OS program during the initialization. The check flag column stores information indicating the end of initialization processing of the logical disk unit in delay response processing, which will be described later. In this description, "0" in the check flag column indicates that the initialization processing (delay response processing) is not ended. In this case, the check flag column stores "0". In other words, the delay response processing (initialization processing) for the logical disk unit (#0) 50 is not ended.

Next, the OS program on the server equipment 13 finds logical disk units included in the storage equipment 21 (hereinafter the number of a logical disk unit is denoted by n) connected to the server equipment 13 device through the communication network 20. Consequently, the OS program issues commands, including various initialization commands to the logical disk units, to the initialization processing unit 1 (step S100). The number (n) of the logical disk unit is a number of the logical disk unit determined by the storage equipment 21 beforehand. The OS program receives the number (n) of the logical disk unit from the storage equipment 21. After that, the OS program uses the number (n) of the unit to issue a command to the logical disk unit.

The control unit 2 of the initialization processing unit 1 receives the command issued from the OS program (step S101).

The control unit 2 determines whether or not the received command is an initialization command to the logical disk unit by checks descriptions in the command list 11 (step S102). If the command is an initialization command (S102: YES), the control unit 2 provides (sends) the received command to the proxy response processing unit 5. Then the process in the initialization processing unit 1 proceeds to step S104.

If the command is not an initialization command (S102: NO), the control unit 2 sends the received command to the storage equipment 21 through the communication network 20 (step S103). Then the process in the initialization processing unit 1 proceeds to step S109.

At step S104, the proxy response processing unit 5 selects the data set (row in FIG. 3) with the logical disk unit number (n) for the command received from the first memory unit 8 (step S104).

The proxy response processing unit 5 extracts the content of a response of the logical disk unit for the received command from the selected data set. More specifically, the proxy response processing unit 5 extracts necessary information for the response from the attribute columns (attribute 1 column to attribute 7 column) included in a row of the target logical disk unit number (n) which is a data set in the first memory unit 8 illustrated in FIG. 3. Then the proxy response processing unit 5 generates the content of the response on the basis of the extracted information (step S105).

The proxy response processing unit 5 transfers the generated content of the response to the control unit 2. The control unit 2 outputs (sends back) the received content of the response to the OS program (step S106).

A specific example of the proxy response processing performed by the proxy response processing unit 5 will be described with reference to the commands on the command list 11 in FIG. 8 and the data in the first memory unit 8 illustrated in FIG. 3.

The command "INQUIRY" in the first row of the command list 11 in FIG. 8 will be described. The "INQUIRY" command is a command that inquires about the vender, model and revision attributes of a logical disk unit by specifying the LUN of the logical disk unit. When an initialization command from the OS program is "INQUIRY LUN (#0)", the proxy response processing unit 5 retrieves the values of the attributes from the row with the logical disk unit number "#0" in the data stored in the first memory unit 8 in response to the command. Namely, the proxy response processing unit 5 retrieves "A" in the attribute 2 column (HDD vender column), "ABC" in the attribute 3 column (HDD model column), and "1" in the attribute 4 column (HDD revision column). Then the proxy response processing unit 5 generates the content of a response on the basis of these items of information (the attribute values). Then the proxy response processing unit 5 sends the generated content of the response to the control unit 2. The control unit 2 sends the content of the response to the OS program as a proxy for the logical disk unit (#0) 50.

The command "TEST UNIT READY" in the second row of the command list 11 in FIG. 8 will be described. The "TEST UNIT READY" command is a command that inquires as to whether or not a logical disk unit is ready by specifying the LUN of the logical disk unit. When an initialization command from the OS program is "TEST UNIT READY (#0)", the proxy response processing unit 5 retrieves an attribute value from the row with the value "#0" in the logical disk unit number column in the data stored in the first memory unit 8 in response to the command. Namely, the proxy response processing unit 5 retrieves information "available" from the attribute 5 column (device state column). Then the proxy response processing unit 5 generates the content of a response on the basis of the information. The proxy response processing unit 5 sends the generated content of the response to the control unit 2. The control unit 2 sends the content of the response to the OS program as a proxy for the logical disk unit (#0) 50.

The command "READ CAPACITY" in the third row of the command list 11 in FIG. 8 will be described. The "READY CAPACITY" command is a command that inquiries about the storage capacity of a logical disk unit by specifying the LUN of the logical disk unit. When an initialization command from the OS program is "READ CAPACITY LUN (#0)", the proxy response processing unit 5 retrieves "100 GB" from the attribute 6 column (capacity column) in the row with the value "#0" in the logical disk unit number column in the data stored in the first memory unit 8 in response to the command. Then the proxy response processing unit 5 generates the content of a response on the basis of the information (attribute value). Then the proxy response processing unit 5 sends the generated content of the response to the control unit 2. The control unit 2 sends the content of the response to the OS program as a proxy for the logical disk unit (#0) 50.

The command "MODE SENSE" in the fourth row of the command list 11 in FIG. 8 will be described. The "MODE SENSE" command is a command that inquiries about various attributes of a logical disk unit by specifying the LUN of the logical disk unit. During initialization, the "MODE SENSE" command inquires as to whether or not data can be written to the logical disk unit. When an initialization command from the OS program is "MODE SENSE LUN (#0)", the proxy response processing unit 5 retrieves information "write enabled" from the attribute 7 column (write attribute column) in the row with the value "#0" in the logical disk unit number column in the data in the first memory unit 8. Then the proxy response processing unit 5 generates the content of a response on the basis of the information (attribute value). Then the proxy response processing unit 5 sends the generated content of the response to the control unit 2. The control unit 2 sends the content of the response to the OS program as a proxy for the logical disk unit (#0) 50.

In this way, the initialization processing unit 1 sends the content of the response generated by the proxy response processing unit 5, instead of a content of a response of the logical disk unit, to the command issued by the OS program as a proxy for the logical disk unit in the storage equipment 21.

Furthermore, the control unit 2 stores commands received from the OS program in the fourth memory unit 10 (see FIG. 7). However, the control unit 2 stores the commands relating to logical disk units in the fourth memory unit 10 from the command with early time stored in the third memory unit 15 (step S107). The OS program issues commands to each relevant logical disk unit. Furthermore, when there is a logical disk unit for which execution of the command has been completed, the OS program issues a command to the logical disk unit before completion of execution of a command issued to another logical disk unit. In other words, the initialization processing unit 1 executes the process from step S104 to step S107 for the logical disk units in parallel.

Next, the proxy response processing unit 5 determines whether or not the initialization processing for all of the logical disk units has been completed (step S108). The proxy response processing unit 5 makes the determination as follows. The proxy response processing unit 5 generates a list for storing the numbers of the logical disk units to be initialized in a memory unit, not depicted, in which information is temporarily stored. Each time when the OS program issues a command, the proxy response processing unit 5 writes the number of the logical disk unit to which the command is issued on the list. The proxy response processing unit 5 compares the unit numbers stored in the list with the unit numbers in the logical disk unit number column stored in the first memory unit 8. The proxy response processing unit 5 determines whether or not the unit numbers of all of the logical disk units match as to determine whether the initialization processing has been completed for all of the logical disk units.

When the numbers of all of the logical disk units match, i.e. when initialization of all logical disk units has been completed (step S108: YES), the process in the initialization processing unit 1 proceeds to step S400.

When the number of any of the logical disk units does not have a match, i.e. when there is a logical disk unit that has not been initialized (step S108: NO), the process in the initialization processing unit 1 returns to step 100.

The process subsequent to step S109 will be described next.

The control unit 2 stores in the second memory unit 9 the time when the control unit 2 receives a command to a logical disk unit that is not related to initialization (step S109).

Then the control unit 2 determines whether or not the flag in the check flag column in the first memory unit 8 that corresponds to the logical disk unit indicates that the logical disk unit has been initialized (=1) (step S110).

When the flag in the check flag column indicates that the logical disk unit has not been initialized (=0) (step S110: NO), the process in the initialization processing unit 1 returns to step S110. In other words, the initialization processing unit 1 repeats the process for determining whether or not the check flag column indicates that the logical disk unit has been initialized (=1).

When the check flag column indicates an initialization state (=1) (S110: YES), the control unit 2 ends the proxy response processing for the logical disk unit. Then the control unit 2 switches to an operation for mediating commands from the OS program and the contents of responses from logical disk units (step S111).

Figure 12:
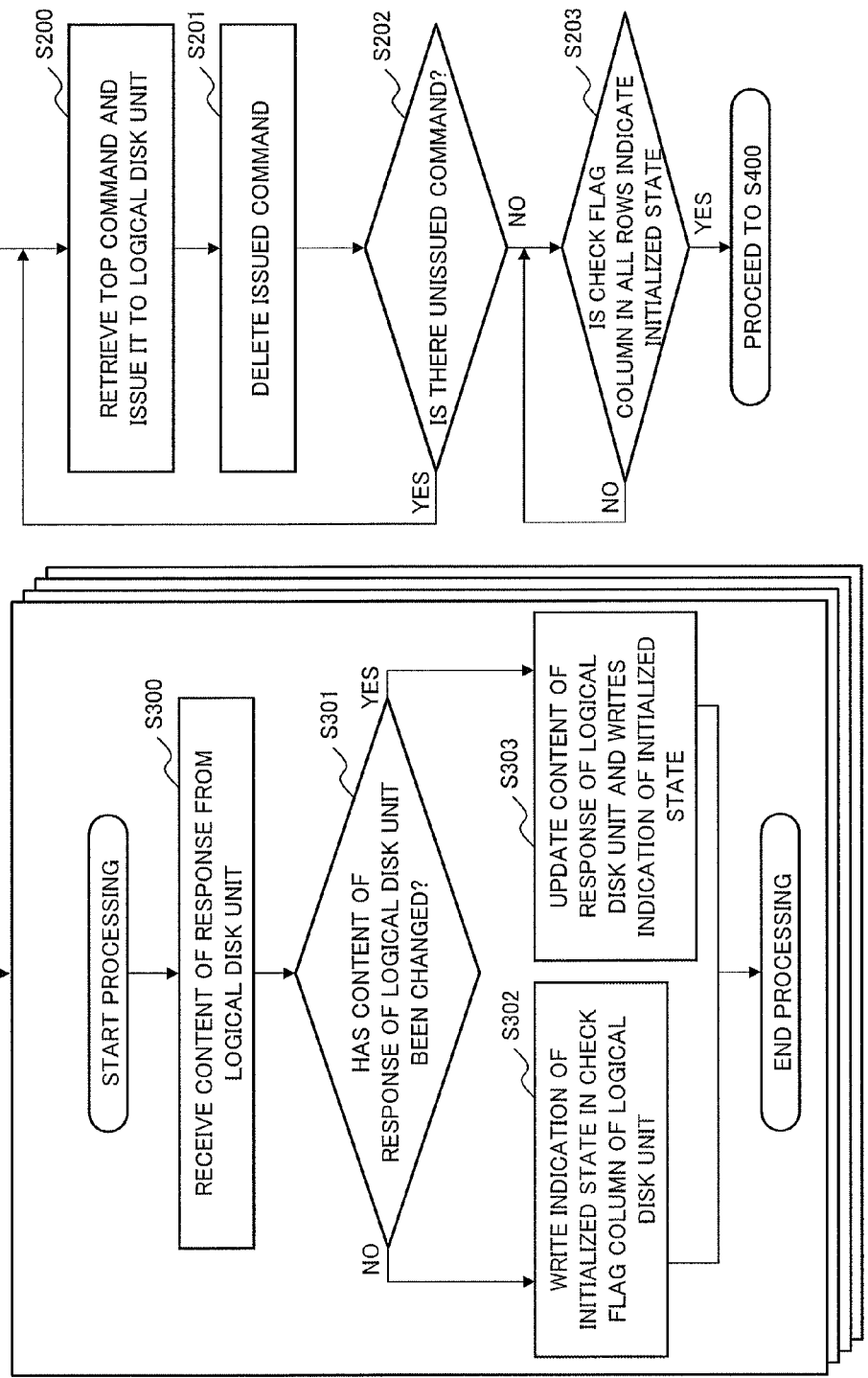
FIG. 12 is a flowchart illustrating an example of operation of a delay response processing performed by the initialization processing unit.

Delay response processing in the delay processing unit 6 for a logical disk unit (step S020) will be described with reference to a flow in FIG. 12.

First, the delay processing unit 6 retrieves the top command stored in the fourth memory unit 10. The delay processing unit 6 issues (outputs) the retrieved command to a logical disk unit to which the retrieved command is to be issued (step S200).

The delay processing unit 6 deletes the issued command from the fourth memory unit 10 (step S201).

The delay processing unit 6 determines whether or not an unissued command remains in the fourth memory unit 10 (step S202).

When there is an unissued command (step S202: YES), the process in the delay processing unit 6 returns to step S200. In other words, the delay processing unit 6 repeats issue of a command stored in the fourth memory unit 10 to a logical disk unit.

When there is not an unissued command (step S202: NO), the delay processing unit 6 determines whether or not all of the rows in the check flag column in the first memory unit 8 indicate the initialized state (=1) (step S203).

When there is a row (logical disk unit) that does not indicates an initialized state (=1) (step S203: NO), the delay processing unit 6 repeats the determination as to whether the check flag column indicates the initialized state (=1).

When all rows indicate the initialized state (=1) (step S203: YES), the process in the initialization processing unit 1 proceeds to step S400.

Next, delay response processing executed by the delay processing unit 6 (the process from step S300 to step S303) will be described.

The delay response processing (step S300) starts when a logical disk unit receives a command and outputs a content of a response to the command, and the control unit 2 receives the content of the response.

First, when the control unit 2 receives the content of the response of the storage equipment 21, the control unit 2 notifies the OS program of an occurrence of the interrupt from a logical disk unit. Then, a program that is contained in the OS program and controls interrupts copies the content of the response received by the control unit 2 in a memory, not depicted, in the server equipment 13. The program that controls interrupts outputs the copied content of the response to the delay processing unit 6. The delay processing unit 6 receives the content of the response (step S300). However, the control unit 2 may send the content of the response to the delay processing unit 6 when the control unit 2 receives the content of the response.

Then, the delay processing unit 6 determines whether or not there is a difference between the received content of the response with the logical disk unit number and information in the data set (row) of the logical disk unit in the columns stored in the first memory unit 8 (step S301).

When there is not a difference (step S301: NO), the delay processing unit 6 writes an indication of the initialized state (=1) in the check flag column in the row of the logical disk unit in the first memory unit 8 (step S302). In other words, the delay processing unit 6 sets a value indicating the initialized state in the check flag column.

When there is a difference (step S301: YES), the delay processing unit 6 updates information in the columns in the row of the logical disk unit stored in the first memory unit 8 with the received content of the response and writes the indication of the initialized state (=1) in the check flag column (step S303). In other words, the delay processing unit 6 sets a value indicating the initialized state in the check flag column. After the execution of step S303, the delay processing unit 6 ends the processing of the interrupt. Responses from a plurality of logical disk units are randomly issued. Accordingly, the initialization processing unit 1 begins to execute the delay processing for the plurality of logical disk units in parallel at receiving a content of response. When the initialization processing unit 1 receives a plurality of contents of responses, the delay processing unit 6 executes a plurality of the delay processing in parallel.

Next, the operation at step 400 will be described. At step 400, the control unit 2 instructs the proxy response processing unit 5 to stop the proxy response processing and instructs the delay processing unit 6 to stop the delay processing. The control unit 2 copies the data stored in the second memory unit 9 to the third memory unit 15.

Furthermore, the control unit 2 switches to an operation to mediate commands from the OS program and contents of responses from logical disk units.

On the basis of the configuration and operations described above, the exemplary embodiment enables reduction of the time required for execution of commands from the OS program to logical disk units and the time required for responding to the commands. In other words, the exemplary embodiment quickly starts up an application. On the basis of these features, the exemplary embodiment achieves the advantageous effect of reducing downtime of the server equipment 13.

The reason is as follow. During initialization processing, the control unit 2 of the exemplary embodiment receives a command sent from the OS program. In accordance with the control of the control unit 2, the proxy response processing unit 5 of the exemplary embodiment responds the content of the response to the command relating to the initialization as a proxy for a logical disk unit by using data stored in the first memory unit. The delay processing unit 6 of the exemplary embodiment issues a command directed to a logical disk unit to the logical disk unit as a proxy for the OS program. The control unit 2 of the exemplary embodiment receives a content of a response of the logical disk unit and sends the content of the response to the OS program. The second memory unit 9 of the exemplary embodiment stores the time when commands are issued from the server equipment 13 to logical disk units, i.e. the order of commands. The third memory unit 15 holds copies of the data in the second memory unit 9 even when power is removed from the server equipment 13. The control unit 2 of the exemplary embodiment uses the stored time (order) to change the order of issue of the commands and store the reordered commands in the fourth memory unit 10. On the basis of these features, the exemplary embodiment is capable of minimizing the influence of delayed issue of commands.

An exemplary advantage of the present invention is that the invention achieves the effect of reducing the time required for rebooting information processing equipment connected to storage equipment containing magnetic disk units.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. Information processing equipment comprising:
a CPU; and
a memory device which is connected to the CPU, wherein
the memory device comprising:
  a first memory unit which stores information identifying a plurality of storage units included in storage equipment, attributes characterizing the storage units, contents of responses of the storage units to commands required for initialization processing for initializing the storage units, and information concerning initialization;
  a second memory unit which stores time when each of commands that are not needed for the initialization processing is issued to the storage units for the first time among commands to the storage units;
  a third memory unit which stores a copy of information stored in the second memory unit at the end of the initialization processing; and
  a fourth memory unit which stores commands to be issued to the storage units in the initialization processing, the commands being sorted in accordance with the time stored in the third memory unit; and
the CPU executing operations comprising: operating as a proxy response processing unit, a delay processing unit and a control unit, wherein
as the proxy response processing unit,
  outputs a content of a response corresponding to each of the commands to the storage units, the content of the response being stored in the first memory unit;
as the delay processing unit,
  outputs a command stored in the fourth memory unit to the storage units,
  receives a content of a response from each of the storage units, determines whether or not there is a difference between the received content of the response and the content of the response of the storage unit stored in the first memory unit, wherein
  when there is a difference, updates the content of the response stored in the first memory unit,
  when there is not a difference, does not update the content of the response stored in the first memory unit, and
  sets a value indicating an initialized state in a check flag column which stores data indicating a state of initialization of each of the storage units; and
as the control unit,
  connects to a server unit including an OS program which sends commands directed to the storage units and receives contents of responses from the storage units,
  starts the initialization processing in response to start of the initialization processing by the OS program,
  as the initialization processing,
    sets a value indicating an uninitialized state in the check flag column,
    when receiving a command directed to the storage unit from the OS program, stores the command in the fourth memory unit in an order stored in the third memory unit,
    determines whether or not the command is an initialization command,
    when the command is the initialization command, sends the command to the proxy response processing unit, receives a content of a response from the proxy response processing unit, and sends the content of the response back to the OS program,
    when the command is not the initialization command, sends the command to one of the storage units and stores time when the command is received in the second memory unit,
    when the control unit receives a content of a response to the OS program from the storage unit, sends the content of the response to the delay processing unit,
  after the end of the initialization processing, copies the content stored in the second memory unit to the third memory unit, and after copying the content, switches the operation as the control unit to an operation for directly mediating the commands from server equipment to the storage units and the contents of responses from the storage units to the server equipment.

2. The information processing equipment according to claim 1, wherein the control unit includes a command list including the initialization command.

3. The information processing equipment according to claim 1, wherein the delay processing unit, after sending the command stored in the fourth memory unit to the storage units and deletes the command from the fourth memory unit.

4. The information processing equipment according to claim 1, wherein at least the first memory unit and the third memory unit are non-transitory storage media.

5. An information processing method for information processing equipment, the information processing equipment comprising: a CPU; and a memory device which is connected to the CPU, wherein the information processing method using the memory device as:

a first memory unit which stores information identifying a plurality of storage units included in storage equipment, attributes characterizing the storage units, contents of responses of the storage units to commands required for initialization processing for initializing the storage units, and information concerning initialization;

a second memory unit which stores time when each of commands that are not needed for the initialization processing is issued to the storage units for the first time among commands to the storage units;

a third memory unit which stores a copy of information stored in the second memory unit at the end of the initialization processing; and a fourth memory unit which stores commands to be issued to the storage units in the initialization processing, the commands being sorted in accordance with the time stored in the third memory unit; and the information processing method causing the CPU to execute the operations of:

(a) outputting a content of a response corresponding to each of the commands to the storage units, the content of the response being stored in the first memory unit;

(b) outputting a command stored in the fourth memory unit to the storage units;

(c) receiving a content of a response from each of the storage units, and determining whether or not there is a difference between the received content of the response and the content of the response of the storage unit stored in the first memory unit;

(d) when there is a difference, updating the content of the response stored in the first memory unit;

when there is not a difference, not updating the content of the response stored in the first memory unit; and (e) setting a value indicating an initialized state in a check flag column which stores data indicating a state of initialization of each of the storage units; and (f) connecting to a server unit including an OS program which sends commands directed to the storage units and receives contents of responses from the storage units;

(g) starting the initialization processing in response to start of the initialization processing by the OS program; and as the initialization processing, (g-1) setting a value indicating an uninitialized state in the check flag column;

(g-2) when receiving a command directed to the storage unit from the OS program, storing the command in the fourth memory unit in an order stored in the third memory unit;

determining whether or not the command is an initialization command;

when the command is the initialization command, sending the content of the response stored in the first memory unit back to the OS program;

when the command is not the initialization command, sending the command to one of the storage units and storing time when the control unit received the command in the second memory unit;

(h) after the end of the initialization processing, copying the content stored in the second memory unit to the third memory unit; and after copying the content, directly mediating commands to server equipment and the storage units and the content of responses from the storage units to the server equipment.

6. A non-transitory computer-readable storage medium storing a program, the program causing information processing equipment, which comprising: a CPU; and a memory device which is connected to the CPU, to perform a method, the method using the memory device as:

a first memory unit which stores information identifying a plurality of storage units included in storage equipment, attributes characterizing the storage units, contents of responses of the storage units to commands required for initialization processing for initializing the storage units, and information concerning initialization;

a second memory unit which stores time when each of commands that are not needed for the initialization processing is issued to the storage units for the first time among command to the storage units;

a third memory unit which stores a copy of information stored in the second memory unit at the end of the initialization processing; and a fourth memory unit which stores commands to be issued to the storage units in the initialization processing, the commands being sorted in accordance with the time stored in the third memory unit; and the method causing the CPU to execute the operations of:

(a) outputting a content of a response corresponding to each of the commands to the storage units, the content of the response being stored in the first memory unit;

(b) outputting a command stored in the fourth memory unit to the storage units;

(c) receiving a content of a response from each of the storage units, and determining whether or not there is a difference between the received content of the response and the content of the response of the storage unit stored in the first memory unit;

(d) when there is a difference, updating the content of the response stored in the first memory unit;

when there is not a difference, not updating the content of the response stored in the first memory unit; and
(e) setting a value indicating an initialized state in a check flag column which stores data indicating a state of initialization of each of the storage units; and
(f) connecting to a server unit including an OS program which sends commands directed to the storage units and receives contents of responses from the storage units;
(g) starting the initialization processing in response to start of the initialization processing by the OS program; and as the initialization processing,
  (g-1) setting a value indicating an uninitialized state in the check flag column;
  (g-2) when receiving a command directed to the storage unit from the OS program, storing the command in the fourth memory unit in an order stored in the third memory unit;
  determining whether or not the command is an initialization command;
  when the command is the initialization command, sending the content of the response stored in the first memory unit back to the OS program;
  when the command is not the initialization command, sending the command to one of the storage units and storing time when the control unit received the command in the second memory unit;
(h) after the end of the initialization processing, copying the content stored in the second memory unit to the third memory unit; and
after copying the content, directly mediating commands to server equipment and the storage units and the content of responses from the storage units to the server equipment.

* * * * *